Feb. 28, 1950    M. E. MOON    2,499,030
UNIVERSAL JOINT
Filed Jan. 6, 1947

Inventor
*Max E. Moon*

By *Clarence A. O'Brien
and Harvey B. Jacobson*
Attorneys

Patented Feb. 28, 1950

2,499,030

UNITED STATES PATENT OFFICE 2,499,030

UNIVERSAL JOINT

Max E. Moon, Prosser, Wash.

Application January 6, 1947, Serial No. 720,420

1 Claim. (Cl. 64—17)

This invention relates to universal joints for flexibly connecting the adjacent ends of shafts.

The primary object of the present invention is to provide a simple, compact and strong universal joint, and particularly one in which simple and effective means is provided to relieve the pivot pins of bending strains and thereby prolong the life and usefulness of the joint.

The exact nature of the present invention will become apparent from the following description when considered in connection with the accompanying drawing, in which.

Figure 1:
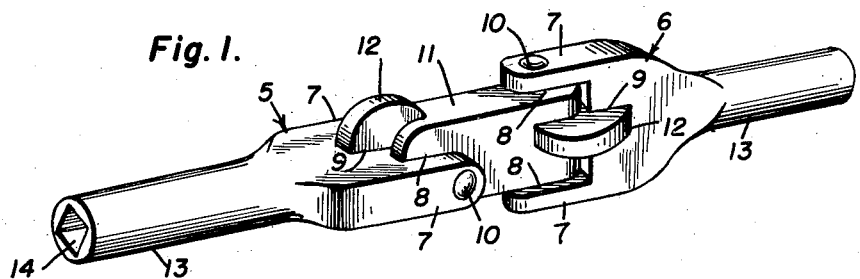
Figure 1 is a perspective view of a universal joint constructed in accordance with the present invention.
Figure 2:
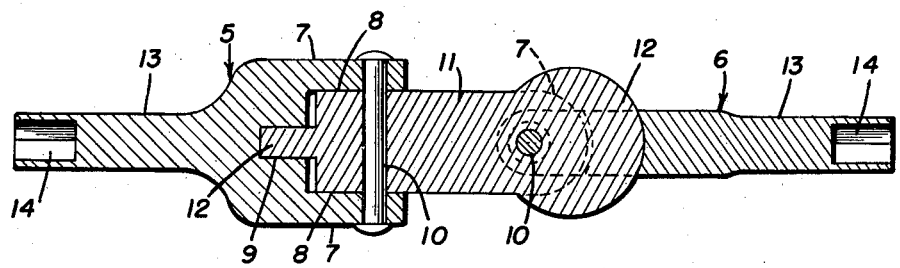
Figure 2 is a central longitudinal sectional view thereof.
Figure 3:
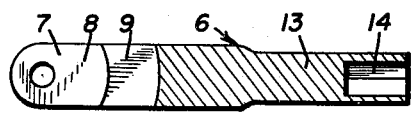
Figure 3 is a central longitudinal sectional view of one of the end members of the universal joint; and, Figure 4 is a perspective view of the intermediate connecting block of the universal joint.
Figure 4:
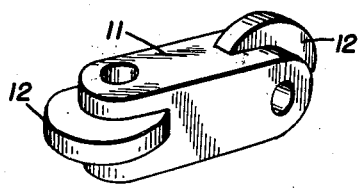

Referring in detail to the drawing, the present universal joint comprises a pair of similar end members 5 and 6, each having a pair of longitudinally extending ears 7 forming a cross slot with its opposite walls 8 in parallel planes and each formed with an open ended cross groove 9 midway between said walls 8 and communicating with the outer end of said cross slot. The opposite walls of the cross groove 9 are in parallel planes parallel with the walls 8 of the cross slot, and a pivot pin 10 is provided in each end member which extends through the cross slot thereof. The ears 7 of one end member are disposed at right angles to those of the other end member.

The joint also includes an intermediate connecting block 11 having its opposite ends pivoted on the pivot pins 10 in the cross slots of the end members 5 and 6, and provided on its opposite ends with central longitudinal guide extensions 12 which are fitted and movable in the cross grooves 9 of the end members 5 and 6 to relieve the pivot pins 10 of bending strains in all angular positions of the end members relative to the connecting block.

The cross grooves 9 are preferably of arcuate form with the cross groove of each end member concentric with the pivot pin 10 thereof. Also, the guide extensions 12 are preferably of crescent shape as shown with the ends thereof projecting beyond opposite sides of the connecting block.

From the foregoing description, it will be seen that the guide extensions 12 engaging in the grooves 9 will effectively brace the end members relative to the connecting block so as to relieve the pivot pins 10 of bending or lateral strains and to thereby promote the efficiency and extend the life of the joint.

In the embodiment shown, the end members are provided with reduced shanks 13 formed in their outer ends with polygonal sockets 14 to receive the correspondingly shaped ends of the shafts to be coupled by the joint.

Minor changes in details of construction are contemplated such as fall within the spirit of the invention as claimed.

What I claim is:

A universal joint comprising a pair of end members, each having a pair of longitudinally extending ears forming a cross slot with its opposite walls in parallel planes and each formed with an open ended arcuate cross groove midway between said walls and communicating with the outer ends of said cross slot, the opposite walls of said cross groove being in parallel planes parallel with the walls of the cross slot, a pivot pin in each end member extending through the cross slot thereof, the ears of one end member being disposed at right angles to those of the other end member, and an intermediate connecting block having its opposite ends pivoted on the pivot pins in the cross slots of the end members and provided on its opposite ends with central crescent-shaped longitudinal guide extensions fitted and movable in the cross grooves of said end members to relieve the pivot pins of bending strains in all angular positions of the end members relative to the connecting block, the cross groove of each end member being concentric with the pivot pin thereof, the opposite ends of said guide extensions projecting beyond opposite sides of the connecting block.

MAX E. MOON.

REFERENCES CITED

The following references are of record in the file of this patent:

UNITED STATES PATENTS

| Number | Name | Date |
|---|---|---|
| 839,469 | Gillette | Dec. 25, 1906 |
| 2,005,202 | Pilger | June 18, 1935 |
| 2,196,297 | Gagne | Apr. 9, 1940 |